June 6, 1950     T. R. TOOHEY     2,510,434
GARDEN TRACTOR WHEEL DRIVE
Filed July 27, 1946     2 Sheets-Sheet 2
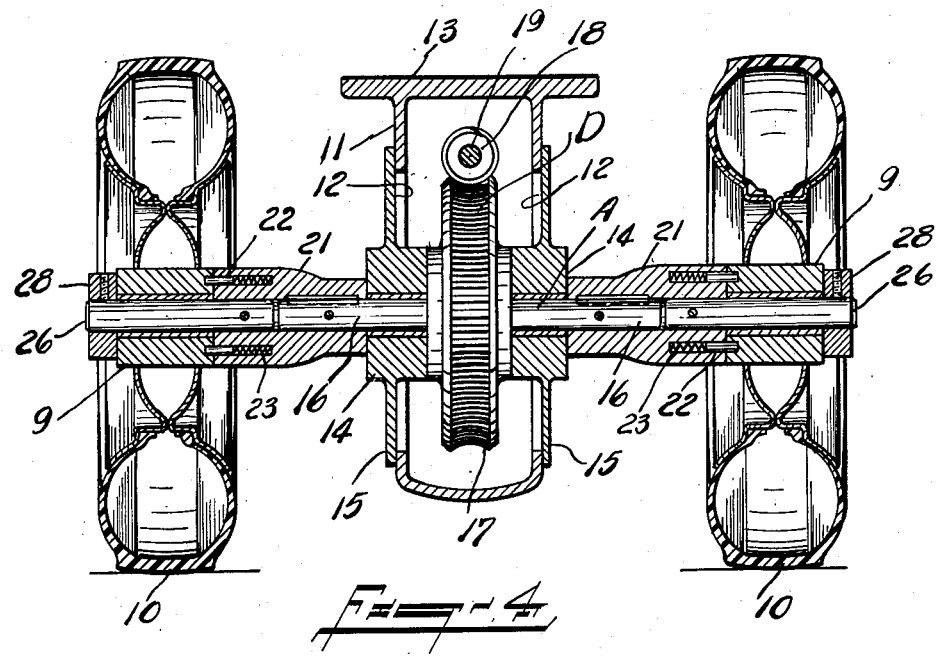
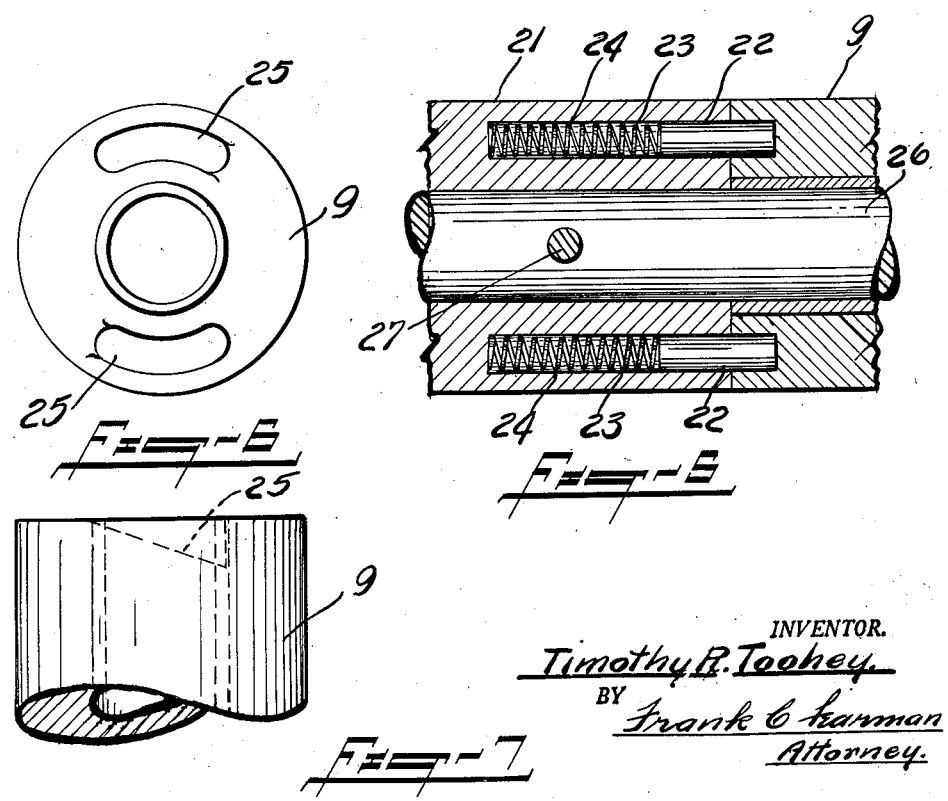
INVENTOR.
Timothy R. Toohey.
BY Frank C. Karman
Attorney.

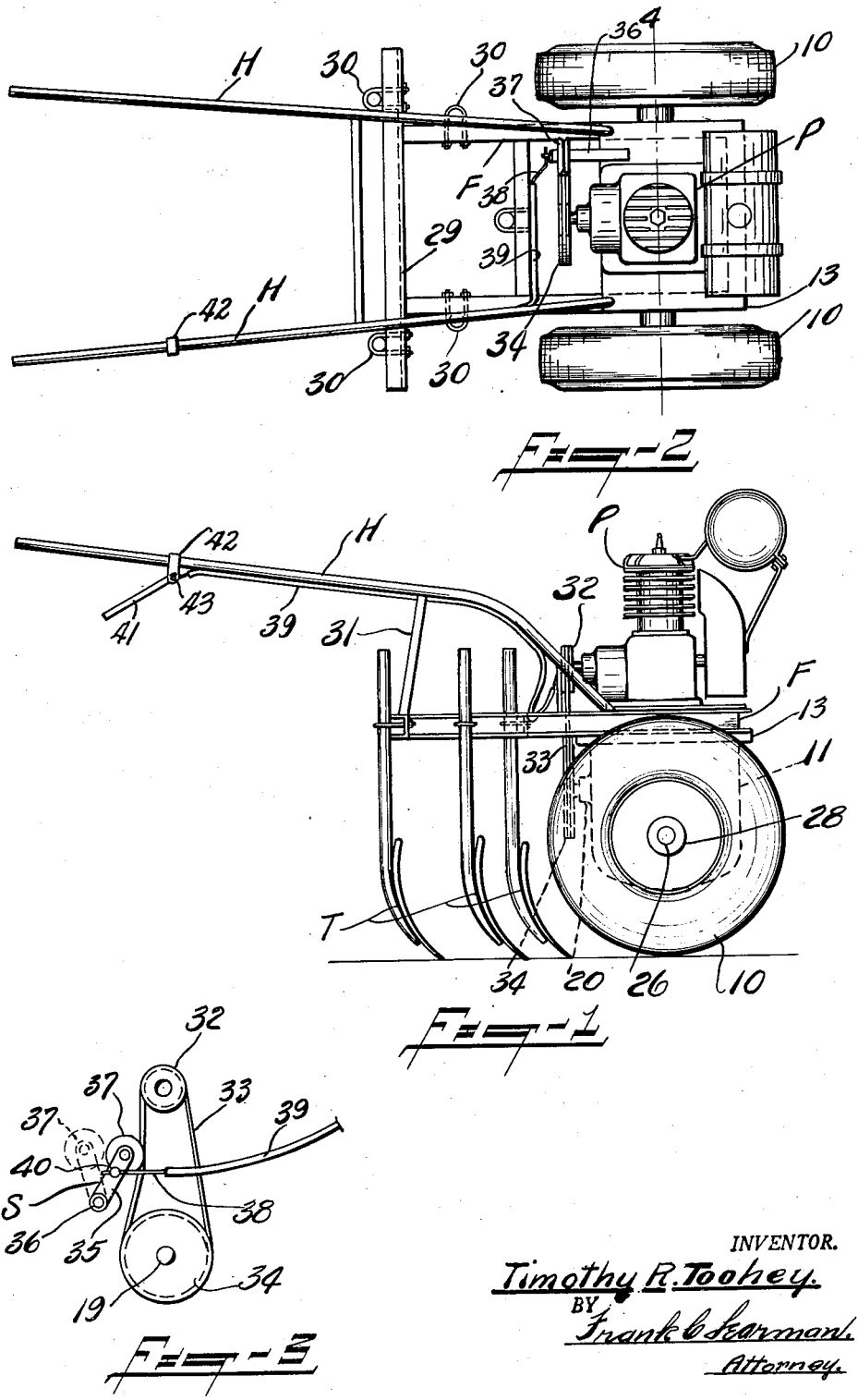

Patented June 6, 1950

2,510,434

UNITED STATES PATENT OFFICE 2,510,434

GARDEN TRACTOR WHEEL DRIVE

Timothy R. Toohey, Gagetown, Mich.

Application July 27, 1946, Serial No. 686,619

3 Claims. (Cl. 180—19)

This invention relates to power-propelled walking cultivators and the like.

One of the prime objects of the invention is to simplify and otherwise improve the construction so that the various parts thereof cooperate and function to render the operation and control of the device simple, practical and positive.

Another object is to design a rugged, practical and economical power cultivator having a very simple differential means so that it can be accurately turned and controlled and so that the attached tools may be accurately maintained with respect to a row or rows of vegetation being cultivated, and in a manner to meet all requirements for successful operation.

A further object still is to design a garden cultivator composed of few parts, all of standard construction, and which can be easily and economically manufactured and assembled without the use of highly skilled labor.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

Fig. 1 is a side-elevational view of my walking cultivator.

Fig. 2 is a top plan view thereof.

Fig. 3 is a detail showing the belt-tightening mechanism, the broken lines showing the idler swung free of the belt.

Fig. 4 is an enlarged, sectional, elevational view taken on the line 4—4 of Fig. 2, the engine being omitted.

Fig. 5 is an enlarged, fragmentary, sectional view illustrating the clutch pins, etc.

Fig. 6 is an end-elevational view of the wheel hub showing the slotted passages therein.

Fig. 7 is a fragmentary, plan illustrating the wedge-shaped slot in the wheel hub.

Referring now more particularly to the drawings in which I have shown the preferred embodiment of my invention, the numeral A indicates the axle of the cultivator which includes wheel hubs 9 on which pneumatic tires 10 are provided, all as clearly shown in Fig. 4 of the drawings.

A worm wheel D forms a part of the axle and comprises a housing 11 having openings 12 therein and an enlarged flanged portion 13 to which a fabricated frame F is secured. Hubs 14 form a part of the housing assembly and are flanged as at 15 to form a closure for the openings 12, said hubs being bored to accommodate the shaft 16 on which a worm wheel 17 is mounted, said wheel meshing with and being driven by a worm 18 which is in turn mounted on a longitudinally disposed shaft 19 journaled in bearing 20 provided on the housing 11.

Ratchet sleeves 21 are securely mounted on the projecting ends of the shaft 16 and are keyed thereon in the conventional manner, and ratchet pins 22 are mounted in openings 23 provided on the outer end walls of the housing 21, springs 24 being interposed between the bottom of the openings 23 and the pin 22 and tend to force the pins outwardly and into engagement with the tapered slots 25 pivoted on the wheel hubs 9 and as will be hereinafter more fully described.

The ground engaging wheels 10 which are provided on the outer ends of the axle A include the hubs 9 which are suitably bored to accommodate axle shafts 26, one end of the axle projecting into the end of the ratchet sleeves 21 and is secured thereto by means of a pin 27, a collar 28 being secured on the opposite end in the conventional manner.

The inner end of each wheel hub 9 is formed with diametrically opposite tapered slots 25 disposed in alignment with the openings 23 in the housings 21, the spring pressed ratchet pins 22 normally driving against the end wall of the slot 25 when the cultivator is being driven, thus forming a one-way clutch, the pins 22 ratcheting in the slot as in the case when one wheel is retarded and the wheel at the opposite side overrides said retarded wheel as when turning etc.

The fabricated frame F is mounted on the flanged portion 13 of the housing 11 and is secured therein in any desired manner, said frame extending rearwardly and is connected by a transversely disposed channel member 29, and individual teeth or soil agitating members T are secured thereto by means of a U-bolt 30 or the like.

Rearwardly extending handles H are secured to the frame F in any desired manner, and braces 31 serve to properly brace the handles on the frame to suit the height desired.

The power plant P is mounted on the frame F in any approved manner and a drive pulley 32 is provided thereon as usual, a drive belt 33 serving to drivingly connect the pulley 32 with a pulley 34 provided on the projecting end of the worm shaft 19 for driving the wheels 10, and a tightener mechanism S is provided for tightening the belt 33, said mechanism including a link 35 which is pivotally mounted on the frame at the point 36, and an idler roller 37 is journaled on the outer end of the link for engagement with the belt 33.

A flexible shaft 38 is mounted in a conduit 39, the one end being secured to the idler link 35 at the point 40, thence leading upwardly along one of the handles H and being pivotally connected to one end of a lever member 41, which lever is pivotally connected to the clamp 42 at the point 43 so that as the lever is swung upwardly, the flexible shaft 38 will swing the link 35 to bring the roller 37 into engagement with the belt to tighten and transmit motion from the power plant to drive the mechanism.

The device is simple, rugged and practical; it is easily controlled and steered; the tools are readily changeable, and it is easy to drive and steer.

What I claim is:

1. A garden cultivator comprising a housing, a worm wheel including an axle mounted in said housing, ratchet sleeves mounted on the opposite ends of the axle, wheel hubs in alignment with the axle and sleeves, stub axles journaled in said hubs and extending into said sleeves, circumferentially disposed, inclined slots in the end walls of the hubs, longitudinally disposed ratchet pins mounted in said sleeves and extending into said slots, a power plant mounted on the housing, and means for drivingly connecting said power plant and worm wheel.

2. The combination defined in claim 1 in which the pins are spring-pressed and the slots tapered to provide for ratcheting of the pins in the slot on one side of the cultivator when the wheel hub and its wheel on one side over-rides the corresponding wheel hub and its wheel at the opposite side.

3. A garden cultivator comprising in combination a casing, a worm and worm wheel assembly mounted therein and including an axle shaft, a ratchet sleeve rigidly mounted on each of the respective ends of the shaft, circumferentially horizontally disposed spaced spring pressed pins mounted in the one end of each sleeve, wheel hubs in longitudinal alignment with said axle and including a shaft extending into said ratchet sleeve and keyed thereto, wedge-shaped slots in the end wall of each hub in alignment with the pins, a prefabricated frame mounted on the casing, steering handles connected thereto, and a power plant mounted on the frame and drivingly connected to said worm shaft.

TIMOTHY R. TOOHEY.

REFERENCES CITED

The following references are of record in the file of this patent:

UNITED STATES PATENTS

| Number | Name | Date |
|---|---|---|
| 369,159 | Burns | Aug. 30, 1887 |
| 967,006 | Feile | Aug. 9, 1910 |
| 1,189,207 | Funk | June 27, 1916 |
| 1,403,080 | Hodge | Jan. 10, 1922 |
| 1,869,746 | Hoke | Aug. 2, 1932 |
| 2,412,705 | Jacques | Dec. 17, 1946 |
| 2,433,709 | Rogers | Dec. 30, 1947 |

FOREIGN PATENTS

| Number | Country | Date |
|---|---|---|
| 198,357 | Great Britain | Dec. 6, 1923 |